Jan. 2, 1940.  C. S. HOWE  2,185,340
DUCTILITY TESTING APPARATUS
Filed Oct. 1, 1938  2 Sheets-Sheet 1
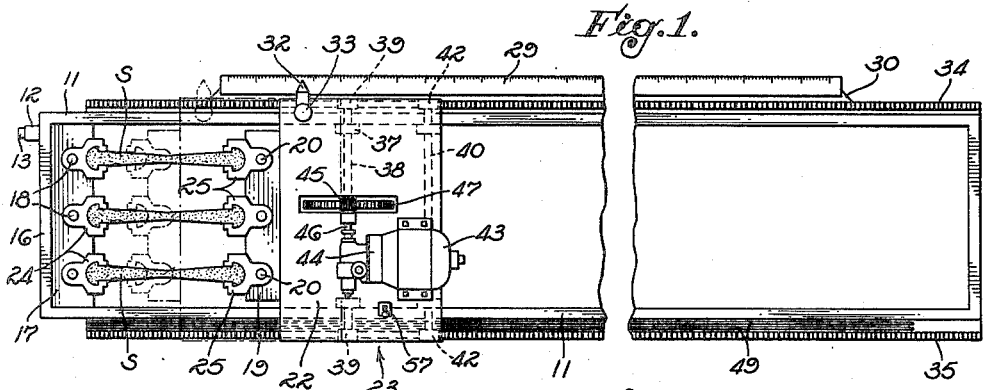
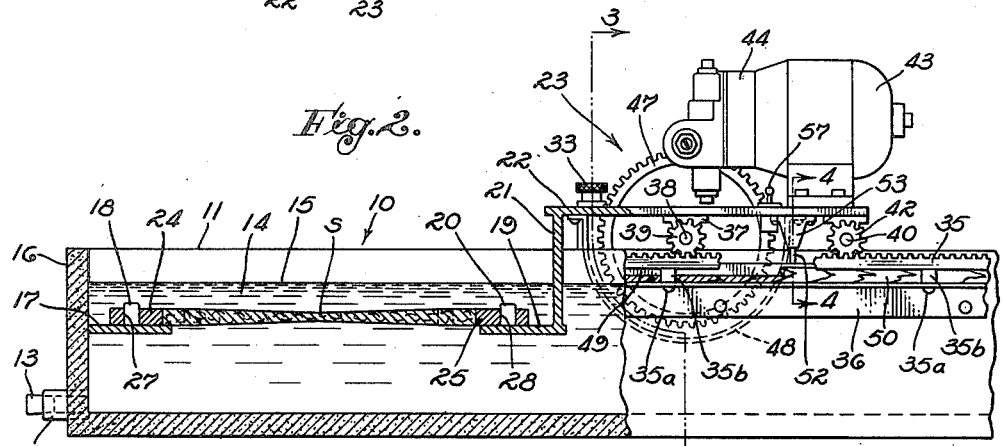
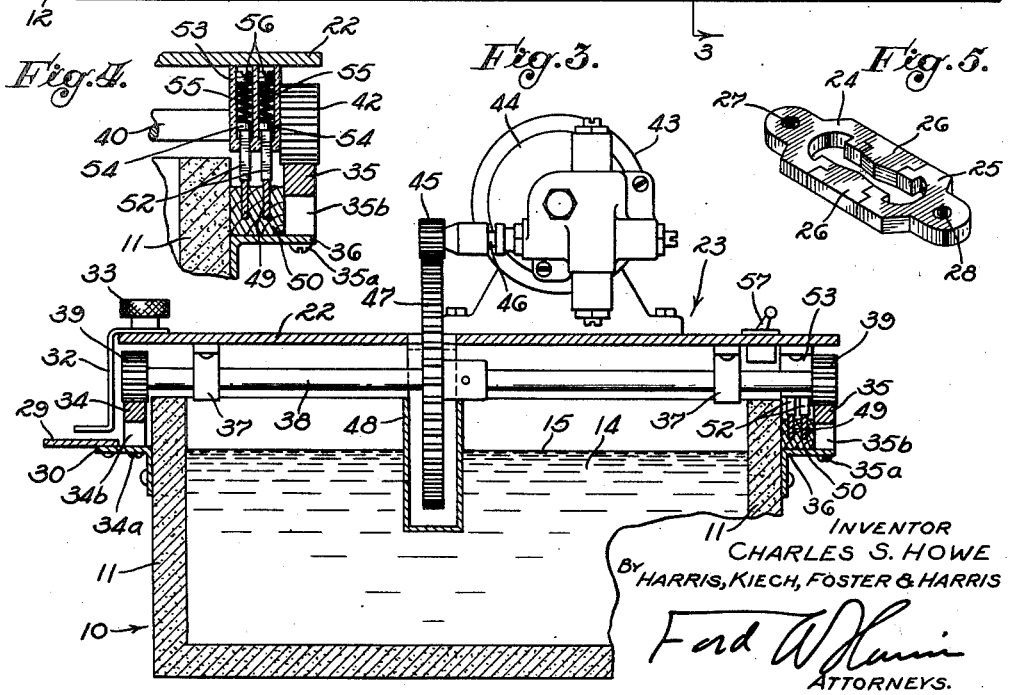
INVENTOR
CHARLES S. HOWE
BY HARRIS, KIECH, FOSTER & HARRIS
ATTORNEYS.

Jan. 2, 1940.                    C. S. HOWE                    2,185,340
                         DUCTILITY TESTING APPARATUS
                            Filed Oct. 1, 1938          2 Sheets-Sheet 2
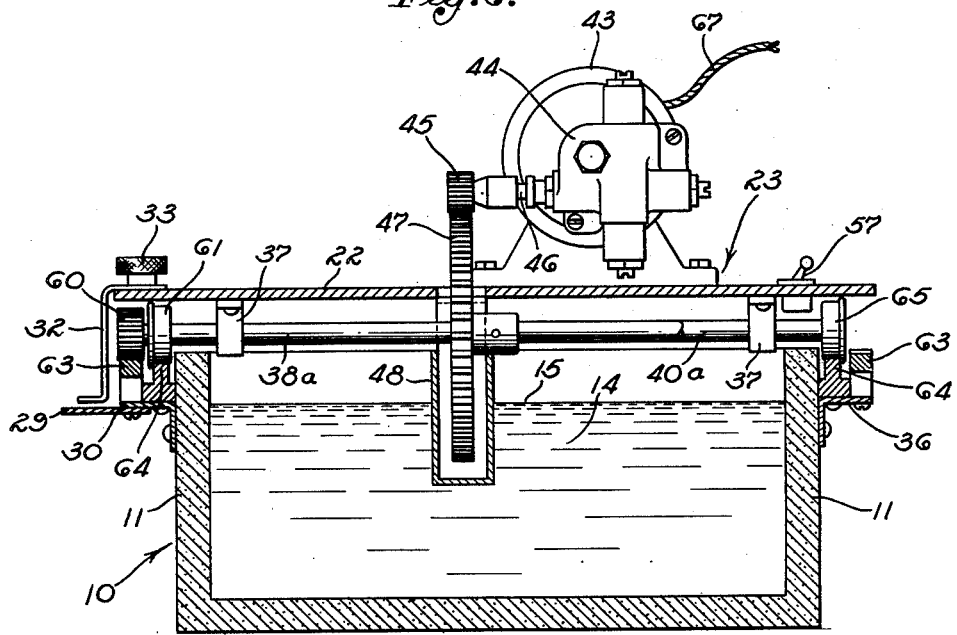
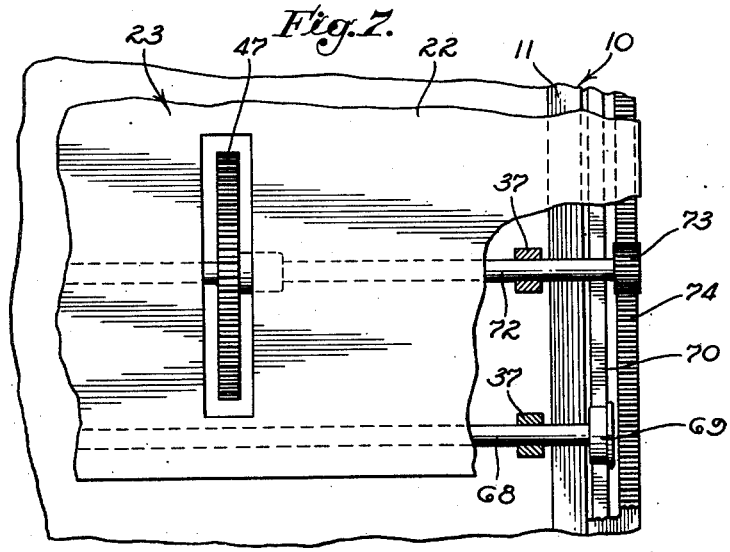
INVENTOR
CHARLES S. HOWE
BY HARRIS, KIECH, FOSTER & HARRIS
ATTORNEYS.

Patented Jan. 2, 1940

2,185,340

UNITED STATES PATENT OFFICE 2,185,340

DUCTILITY TESTING APPARATUS

Charles S. Howe, Pasadena, Calif., assignor to Industrial Developments Incorporated, Los Angeles, Calif., a corporation Application October 1, 1938, Serial No. 232,850

6 Claims. (Cl. 265—12)

My invention relates to material testing devices, with particular reference to apparatus for ascertaining the ductility of asphaltic, bituminous, and like materials, and is a continuation-in-part of my co-pending application entitled "Ductility testing apparatus", Serial No. 180,372, filed December 17, 1937.

In accordance with the standard procedure specified by the American Society for Testing Materials, the ductility rating of a bituminous substance is determined by noting the length a standard sample may be stretched without breaking at 5 cm. per minute in a water bath at 25° C. For special purposes, other rates and other temperatures may be specified. In the usual practice, the sample is immersed in an elongated tank with one end of the sample held fixed and the other end engaged by a carriage that traverses the tank at the standard rate of speed.

The present invention is directed primarily to the means for mechanically relating the carriage to the tank and to the means for actuating the carriage.

In one of the well known devices of the prior art, the carriage is mounted on and moved by a pair of immersed screws extending lengthwise of the tank. The turbulence in the water caused by the rotation of these screws, and by their vibration, interferes with visibility of the immersed sample, a fact particularly objectionable since a sample usually stretches to an exceedingly fine thread before breaking. It has also been found that such turbulence may cause premature breaking of such a thread. A further disadvantage of the screw drive is a certain inconvenience involved in shifting the carriage back to the starting point after completion of a test, it being necessary to disengage the carriage and then to adjust the carriage for new engagement at the zero point of the ductility scale.

One of the objects of my invention is to provide a drive arrangement that will avoid turbulence in the water bath especially in the vicinity of the breaking point of the sample under test.

A further object is to provide a drive arrangement that will involve minimum inconvenience in returning the carriage to its starting point, in contrast to the screw drive described above, and in contrast to other types of drive known to the art.

An additional object is to simplify the driving mechanism of such a testing device. Under this heading, I propose to eliminate the problem of transmitting power from a fixed power unit to a moving carriage, to reduce the size of power unit required, and to minimize vibration of a tank by a power unit. Such vibration is markedly noticeable where long driving screws span the length of a tank, and is appreciable whenever any type of power unit is mounted directly on a tank.

A feature of my invention is the conception that all of the above objects of my invention may be attained by a construction in which the power unit is mounted directly on the carriage to make the carriage a self-contained unit.

The above and other objects and advantages of my invention will be apparent in the description to follow taken with the accompanying drawings.

In the drawings:

Fig. 1 is a plan view of my apparatus.

Fig. 2 is a side elevation of the apparatus, with the tank partially broken away.

Fig. 3 is a transverse section slightly enlarged taken as indicated by the line 3—3 of Fig. 2.

Fig. 4 is a fragmentary section greatly enlarged taken as indicated by the line 4—4 of Fig. 2.

Fig. 5 is a perspective view of the mold for forming a briquette of material to be tested.

Fig. 6 is a view similar to Fig. 3, with certain parts broken away, showing a modification of the carriage drive.

Fig. 7 is a fragmentary plan view showing a second modification of the carriage drive.

The drawings show a tank 10 sufficiently elongated to permit stretching a sample 110 cm. for example, the tank preferably being made of material providing relatively rigid side walls 11. The tank is provided with a drain outlet 12 normally closed by a plug 13, and in service contains a body of water 14 to a level 15. Suitable means, not shown in the drawings but well known to the art, may be employed to control the temperature of the water automatically, such means preferably including a thermostat responsive to the water temperature.

Fixed to an end wall 16 of the tank is a submerged horizontal plate 17 carrying upwardly extending pins 18. On the same level is a similar plate 19 having corresponding pins 20, this second plate being carried by a wall member 21 depending from the platform 22 of a carriage generally designated by the numeral 23.

Preparatory to a test, the material to be rated is formed by the standard procedure into a briquette by a mold constructed as shown in Fig. 5. The mold comprises four pieces, clips 24 and 25 at the ends and an intermediate pair of side blocks 26. After a briquette of the thickness of the mold is formed in the configuration indicated, the eye 27 of the clip 24 is inserted on a fixed pin 18, and the eye 28 of the clip 25 is engaged with the corresponding pin 20 that moves with the carriage 23. The two side blocks 26 are then removed, leaving the briquette engaged by the end clips 24 and 25. The briquette is then stretched to its breaking point by movement of the carriage. More than one briquette may be stretched simultaneously.

To ascertain the length of the sample at the breaking point, a horizontal scale 29 is mounted on an angle-iron 30, the angle-iron being secured to one of the side walls 11. A pointer mounted on the carriage to traverse this scale may comprise an arm 32 secured by a thumb-screw 33 in an adjustable manner to permit accurate positioning of the pointer at the zero point of the scale.

The present invention is characterized by the conception of mounting the carriage on rails at each side of the tank, preferably at least one of the rails being in the form of a rack to provide positive traction for driving the carriage. In the preferred form of the invention shown in the drawings, both of the rails are racks. One of the rails or racks 34 is mounted on the aforementioned angle-iron 30 by screws 34a and sleeves 34b, and the other rail or rack 35 is mounted on a similar angle-iron 36 by screws 35a and sleeves 35b on the opposite side wall 11 of the tank. Preferably the sleeves 34b and 35b are of rubber or other yielding material. Journaled in bearings 37 on the bottom face of the carriage platform 22 are two spaced shafts, a shaft 38 having pinions 39 keyed to its opposite ends, and a shaft 40 carrying pinions 42. These pinions engage the racks 34 and 35 on opposite sides of the tank and support the carriage 23.

The shaft 38 is driven by a suitable motor 43, which may be of the synchronous type. A speed reduction unit 44 is combined with the motor and further speed reduction may be had by providing a relatively small pinion 45 on the end of the shaft 46 driven by the speed reduction mechanism, the small pinion 45 engaging a relatively large gear 47 keyed to the shaft 38 under the carriage platform. Since the gear 47 extends below the water level 15, it is desirable to enclose the gear in a circular housing 48 secured to the carriage platform 22. No turbulence problem is involved because any disturbance of the water occasioned by movement of the housing 48 is remote from the sample being tested, and such disturbance is insignificant since no rotary motion is involved, the housing merely moving through the water in a straight line at the usual relatively slow testing speed of 5 cm. per minute.

In the preferred form of my invention shown in the drawings, the circuit for energizing the motor 43 includes a pair of conductors extending longitudinally of the tank. These conductors are shown as two strips of metal 49 embedded in some non-conducting material, such as a strip of wood 50, the wooden strip resting on the angle-iron 36 between the rack 35 and the side wall 11 of the tank. It will be noted that the insulating material protects all but the upper edges of the two conductors, and that these upper edges are given some measure of protection by the fact that they are positioned in the recess formed by the rack and the wall of the tank. There is very little likelihood of an operator touching either of the two conductors by accident.

Cooperating with the two conductors 49 are two corresponding brushes or contact elements 52 that extend downward through suitable apertures in a contact housing 53 of insulating material mounted on the undersurface of the platform 22. To keep the contact elements 52 from dropping through the housing when the carriage is lifted from the rack, the inner ends 54 of the contact elements are enlarged as indicated in Fig. 4. To provide for a desirable downward pressure against the contact elements, helical springs 55 may be confined between the inner ends 54 of the contact elements and set-screws 56. A switch for controlling the motor circuit may be located anywhere on the tank or on the carriage. In the drawings, such a switch 57 for manual control is located on the carriage platform 22.

The procedure for ascertaining the ductility rating of a sample will be clear from the foregoing description. Movement of the carriage away from the end wall 16 of the tank stretches the sample S with minimum disturbance of the water bath. Since the carriage is a self-contained unit that simply rests upon the tank, at the end of a test the carriage may be lifted from the rack, becoming entirely free and independent of the tank, and then may be replaced on the tank at the zero end of the scale to start a new test. It will be apparent to those skilled in the art that to lift the carriage from the rack and replace it at the new position is an exceedingly simple procedure.

It will be noted that the motor and the drive mechanism are disposed to discourage the transmission of vibration to the body of water in the tank. In the first place, the motor and the speed reduction mechanism are mounted on the platform 22 of the carriage, being thereby removed from direct contact with the tank. It will further be noted that the tank walls are relatively rigid and that any vibration from the carriage must be transmitted to the tank through the yielding sleeves 34b and 35b, and through the angle-irons 30 and 36, these angle-irons being disposed to favor absorption of motor vibration. Preferably the angle-iron members 30 and 36 will be relatively thin to provide a desirable degree of flexibility. A further feature of my invention in the direction of vibration reduction is the employment of a relatively low powered prime mover made possible by my construction.

Fig. 6, showing a modified driving arrangement for the carriage 23, is similar to the above-described form of my invention, corresponding numbers being employed to designate corresponding parts. In this form of my invention the drive shaft 38a has keyed to opposite ends thereof driving pinions 60, and has mounted thereon, preferably for independent rotation, a pair of flanged supporting wheels 61 whereby the functions of driving the carriage and supporting the carriage are separated. On each side of the carriage the pinion 60 at the end of the shaft 38a engages a rack 63 and the flanged wheel 61 on each side of the carriage rides upon a corresponding rail 64 for supporting the carriage. The second shaft 40a of the carriage has a flanged supporting wheel 65 at each of its ends riding upon the corresponding rail 64 to cooperate in supporting the carriage. In this modified form of my invention the motor is energized directly through conductors in a suitable flexible cable 67.

A second modification of driving arrangement for the carriage is suggested by Fig. 7 in which parts previously described are given corresponding numerals. In this particular form of my invention a pair of spaced supporting shafts 68 is employed, only one of which is shown in Fig. 7. Each of the shafts 68 carries on each of its ends a supporting wheel 69 for the carriage that rides upon a corresponding rail 70. A drive shaft 72 that is driven by the aforementioned gear 47 actuates a pinion 73 on each end of the shaft, the pinion being in engagement with a corresponding rack 74.

All the forms of my invention are characterized by the conception of a self-propelled carriage adapted to travel along the tank. It is important to note that the length of the tank may be extended indefinitely without complications, whereas difficulties would arise were the carriage driven by screws or cables actuated from some stationary point.

My description of the specific forms of the invention for the purposes of this disclosure will suggest to those skilled in the art various changes and modifications that do not depart from the spirit of my invention. I reserve the right to all such changes and modifications within the scope of my appended claims.

I claim as my invention:

1. A ductility testing device of the character described, comprising: a tank; a carriage mounted on the tank; means fixed within the tank to engage one portion of a test sample; means on the carriage to engage an opposite portion of the test sample; and a power unit mounted on the carriage to move the carriage along the tank to stretch said test sample, said carriage being removably supported by the tank whereby the carriage may be lifted from the tank after a test and replaced thereon at a starting point for a subsequent test.

2. A ductility testing device of the character described, comprising: a tank; at least one rail on each side of the tank, at least one of said rails being in the form of a rack; a carriage; wheel means supporting the carriage on said rails; driving means carried by the carriage for engagement with said rack; a motor mounted on the carriage and operatively connected with said driving means; means fixed within the tank to engage one portion of a test sample; and means on the carriage to engage an opposite portion of the test sample, whereby the sample may be stretched by movement of the carriage.

3. A ductility testing device of the character described, comprising: a tank having relatively rigid side walls; rail means on each side of the tank, including at least one toothed driving rail; a carriage; wheel means on the carriage engaging said rails to support and drive the carriage, including a toothed wheel meshing with said driving rail; a motor mounted on the carriage and connected with said wheel to drive the carriage; means fixed within the tank to engage one portion of a test sample; means on the carriage to engage an opposite portion of the test sample, whereby the sample may be stretched by movement of the carriage; and a scale to indicate the distance the carriage moves in stretching a sample.

4. A ductility testing device of the character described, comprising: a tank having relatively rigid side walls; rail means on each side of the tank, including at least one toothed driving rail; means yieldingly supporting said rail means on the tank; a carriage; wheel means on the carriage engaging said rails to support and drive the carriage, including a toothed wheel meshing with said driving rail; a motor mounted on the carriage and connected with said wheel to drive the carriage; means fixed within the tank to engage one portion of a test sample; means on the carriage to engage an opposite portion of the test sample, whereby the sample may be stretched by movement of the carriage; and a scale to indicate the distance the carriage moves in stretching a sample.

5. A ductility testing device of the character described, comprising: a tank; a pair of rails, one on each side of the tank; a carriage; wheels supporting said carriage on said rails; rack means supported by the tank; gear means on the carriage engaging said rack; a motor mounted on the carriage to drive said gear; means fixed within the tank to engage one portion of a test sample; means on the carriage to engage an opposite portion of the test sample, whereby the sample may be stretched by movement of the carriage; and a scale to indicate the distance the carriage moves in stretching a sample.

6. A ductility testing device of the character described, comprising: a tank; at least one rail on each side of the tank, at least one of said rails being in the form of a rack; a carriage; wheel means supporting the carriage on said rails; driving means carried by the carriage for engagement with said rack; a motor mounted on the carriage and operatively connected with said driving means; means fixed within the tank to engage one portion of a test sample; means on the carriage to engage an opposite portion of the test sample, whereby the sample may be stretched by movement of the carriage; and a circuit for energizing said motor, said circuit including a control switch, a pair of conductors extending longitudinally of the tank, and a pair of contact elements mounted on the carriage for moving contact with said conductors.

CHARLES S. HOWE.